(12) United States Patent
Uenishi

(10) Patent No.: US 7,589,817 B2  
(45) Date of Patent: Sep. 15, 2009

(54) METHOD OF MANUFACTURING A DISPLAY PANEL

(75) Inventor: Masayoshi Uenishi, Himeji (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 275 days.

(21) Appl. No.: 11/598,794

(22) Filed: Nov. 14, 2006

(65) Prior Publication Data

US 2007/0109488 A1  May 17, 2007

(30) Foreign Application Priority Data

Nov. 15, 2005 (JP) .............................. 2005-330223

(51) Int. Cl.
*G02F 1/1339* (2006.01)
(52) U.S. Cl. ...................................................... 349/190
(58) Field of Classification Search ................... 349/190
See application file for complete search history.

(56) References Cited

FOREIGN PATENT DOCUMENTS

| CN | 2078200 U | 6/1991 |
|---|---|---|
| JP | 6-67192 | 3/1994 |
| JP | 2001-296534 | 10/2001 |
| JP | 2001298257 A * | 10/2001 |

OTHER PUBLICATIONS

Office Action from Chinese Patent Office for Application No. 200610162464.8 dated Dec. 14, 2007.

* cited by examiner

*Primary Examiner*—Sarah Song
(74) *Attorney, Agent, or Firm*—Finnegan, Henderson, Farabow, Garrett & Dunner, L.L.P.

(57) ABSTRACT

A method of manufacturing a display panel which comprises a first substrate, a second substrate arranged opposite to the first substrate with a gap therebetween, a plurality of display elements provided between the first and second substrates, a sealing member surrounding the display elements and bonding the first and second substrates to each other, and a filler layer provided between the first and second substrates and located outside the sealing member. The method comprises applying filler to a roller, moving the roller on an edge of the display panel, thereby filling a gap between the second substrate and that part of the first substrate which lies outside the sealing member, and curing the filler filled in the gap.

12 Claims, 7 Drawing Sheets

| Items | Roller application | | Dispenser application | |
|---|---|---|---|---|
| | Result | Evaluation | Result | Evaluation |
| Thickness | 10-20 μm | ○ | 200-300 μm | × |
| Dripping | Not observed | ○ | observed (100%) | × |
| Amount of resin used | 0.00085g/panel | ○ | 0.06375g/panel | △ |
| Permeability | 100% | ○ | 40% | △ |
| Time required | 12.8sec/panel | ○ | 74.7sec/panel | × |
| Reliability | 90% at 60°C, 85% at 85°C | ○ | 90% at 60°C, 85% at 85°C | △ |
| Manufacture efficiency | — | ○ | — | △ |
| Overall evaluation | — | ○ | — | □ |

FIG. 8

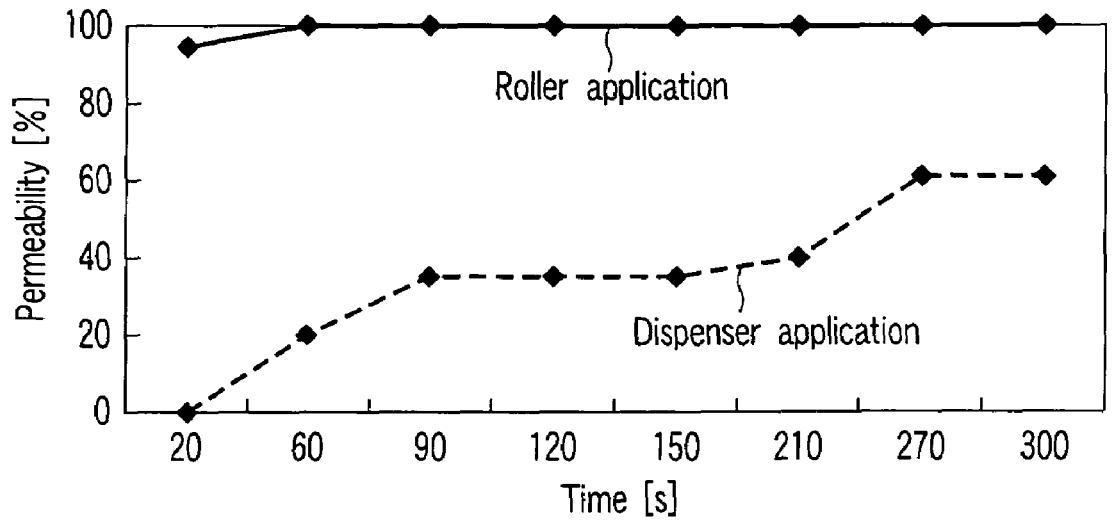
F I G. 9
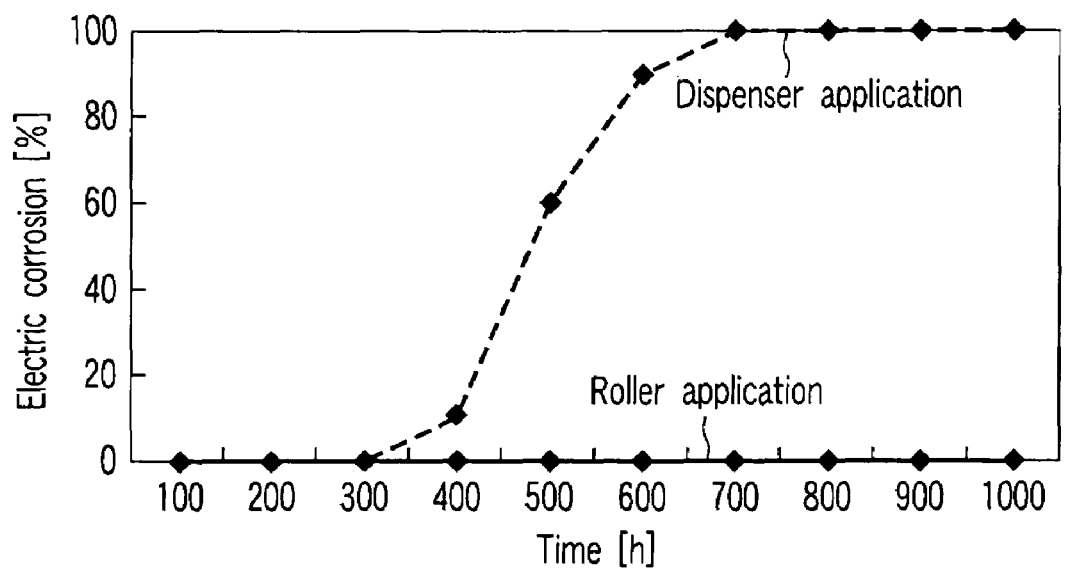
F I G. 10

METHOD OF MANUFACTURING A DISPLAY PANEL

CROSS-REFERENCE TO RELATED APPLICATIONS

This application is based upon and claims the benefit of priority from prior Japanese Patent Application No. 2005-330223, filed Nov. 15, 2005, the entire contents of which are incorporated herein by reference.

BACKGROUND OF THE INVENTION

1. Field of the Invention

This invention relates to the manufacturing method of a display panel.

2. Description of the Related Art

Generally, liquid crystal displays are used as image display devices. They are excellent in picture visibility and have high resolution and a large angle of visibility. Therefore, the demand for them is greatly increasing for use on video cameras, AV or DVD players, and car navigation systems. Such a liquid crystal display comprises a liquid crystal display panel, a drive circuit, and the like. The liquid crystal display panel comprises an array substrate, a counter substrate, a plurality of display elements, a sealing member, and a liquid crystal layer. The array substrate and counter substrate are arranged opposite to each other with a predetermined gap therebetween. The display elements are provided between the array substrate and the counter substrate. The sealing member surrounds the display elements and bonds the array substrate and the counter substrate to each other. The liquid crystal layer is held between the array substrate and the counter substrate.

The array substrate is a glass substrate. Signal lines and scanning lines are arranged on that surface of the glass substrate which faces the counter substrate. In the region surrounded by the sealing member, the signal lines intersect with the scanning lines at right angles. The signal lines and scanning lines therefore demarcate the display elements. Each signal line has one end part extending beyond the sealing member, reaching a signal-line-driving circuit connection region that lies outside the sealing member. Each scanning line has one end part extending beyond the sealing member, reaching a scanning-line-driving circuit connection region that lies outside the sealing member.

The counter substrate has another glass substrate. On the other glass substrate, a counter electrode and the like are provided. Each display element comprises a thin film transistor (TFT), a pixel electrode, a part of the liquid crystal layer, and a part of the counter electrode. The TFT is provided near the intersection of one signal lien and one scanning line. The pixel electrode is connected to the TFT. The part of the liquid crystal layer is opposed to the pixel electrode. The part of the counter electrode is opposed to the pixel electrode. The drive circuit mentioned above has a signal-line driving circuit and a scanning-line driving circuit. The signal-line driving circuit is mounted in the signal-line-driving-circuit connection region of the glass substrate, and is connected to the signal lines. The scanning-line driving circuit is mounted in the scanning-line-driving circuit connection region of the glass substrate, and is connected to the scanning lines.

In the liquid crystal display panel, the gap between the counter substrate and that surface of the sealing member which faces the array substrate may be filled with filler. The filler may be ultraviolet-curable resin applied into the gap. The liquid crystal panel is often driven at high voltages in a high-temperature and high-humidity atmosphere, particularly if used in vehicles. This is why the ultraviolet-curable resin is applied in that part of the gap which lie outside the sealing member and into which the other end parts of the signal lines and scanning lines extend. Thus, if the other end parts of the signal lines or the scanning lines, or both, extend from the sealing member, electric corrosion of the other end parts of these lines is suppressed. Such electric corrosion may result from the dew on those parts of the signal lines or scanning lines that are located outside the sealing member, or from impurity ions adhered to the signal lines or scanning lines.

As shown in, for example, Jpn. Pat. Appln. No. 6-67192, a dispenser may be used to fill the gap at the sealing member with ultraviolet-curable resin. In this case, the resin applied is filled, while being leveled.

In recent years, display panels have become thin. More precisely, both glass substrates used are as thin as 0.7 mm to 1.2 mm. It is therefore difficult to fill up the gap at the sealing member material with ultraviolet-curable resin in the method using a dispenser, only by leveling. If the gap at the sealing member cannot be filled up with the resin, a space will remain and electric corrosion can hardly be prevented. The ultraviolet-curable resin may drip down on the outer surface of both glass substrates. If this happens, the resin must be scraped off from the glass substrates.

BRIEF SUMMARY OF THE INVENTION

The present invention has been made in view of the above point.

An object of the invention is to provide a method of manufacturing a display panel, in which the gap between a first substrate and a second substrate, which lies outside a sealing member, can be desirably filled with filler.

To achieve the object, according to an aspect of the present invention, there is provided a method of manufacturing a display panel which comprises a first substrate, a second substrate arranged opposite to the first substrate with a gap therebetween, a plurality of display elements provided between the first and second substrates, a sealing member surrounding the display elements and bonding the first and second substrates to each other, and a filler layer provided between the first and second substrates and located outside the sealing member, the method comprising:

applying filler to a roller;

moving the roller on an edge of the display panel, thereby filling a gap between the second substrate and that part of the first substrate which lies outside the sealing member; and curing the filler filled in the gap.

According to another aspect of the present invention, there is provided a method of manufacturing a display panel which comprises a first substrate, a second substrate arranged opposite to the first substrate with a gap therebetween, a plurality of display elements provided between the first and second substrates, a sealing member surrounding the display elements and bonding the first and second substrates to each other, a plurality of lines provided on that surface of the first substrate which faces the second substrate, and extending outwards, at one end part, from the sealing member, and an electric-corrosion preventing member provided between the first and second substrates and located outside the sealing member, said method comprising:

applying electric-corrosion preventing material to a roller;

moving the roller on that edge of the display panel, from which other end parts of the lines extend outwards, thereby filling a gap between the second substrate and that part of the first substrate which lies outside the sealing member; and curing the electric-corrosion preventing material filled in the gap.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 8 is a table showing the results of the dispenser application of resin and the results of roller application of resin;

FIG. 9 is a graph showing how the ultraviolet-curable resin changes in permeability with the time spent in the roller application, and with the time spent in the dispenser application; and FIG. 10 is a graph showing how electric corrosion proceeds as time elapses in liquid crystal display panels made by roller application and dispenser application, if the panels are left at temperature of 85° C. and humidity of 85%.

DETAILED DESCRIPTION OF THE INVENTION

Figure 1:
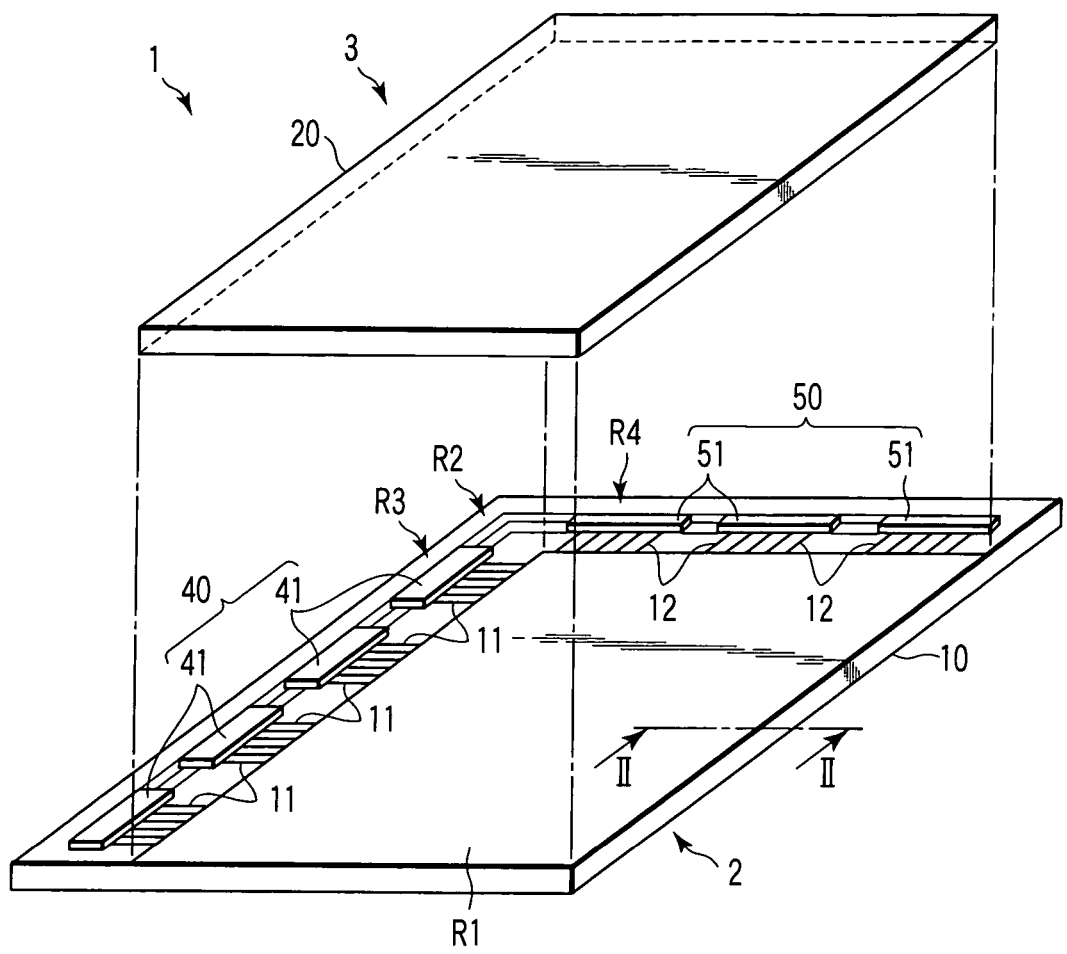
FIG. 1 is an exploded perspective view of a liquid crystal display panel manufactured by a method according to an embodiment of the present invention.

A method of manufacturing a display panel for use in displays, which is an embodiment of this invention, will be described, with reference to the accompanying drawings. Note that this method is designed to manufacture a liquid crystal display panel for use in, particularly, a liquid crystal display.

As shown in FIGS. 1 to 4, the liquid crystal display comprises a liquid crystal display panel 1 and a back light unit 9. The panel 1 comprises an array substrate 2, or first substrate, a counter substrate 3, or second substrate, a plurality of display elements 6, a sealing member 7, a liquid crystal layer 4, and a color filter 5. The array substrate and counter substrate 3 are arranged opposite to each other with a predetermined gap therebetween. The display elements 6 are provided between the array substrate and the counter substrate. The sealing member 7 surrounds the display elements and bonds the array substrate and the counter substrate to each other. The liquid crystal layer 4 is formed between the array substrate and the counter substrate. The array substrate 2 and the counter substrate 3 are rectangular plates.

The array substrate 2 has a rectangular junction region R1 and a drive-circuit connection region R2. The region R2 is contiguous to the junction region R1. The counter substrate 3 is opposed to the junction area R1 of the array substrate 2.

The array substrate 2 has a glass substrate 10 that is a transparent insulating substrate. On the glass substrate 10, signal lines 11 and scanning lines 12 are formed as wires. In the region surrounded by the sealing member 7, the signal lines 11 intersect with the scanning lines 12. In this embodiment, the pixels are formed, each in a region surrounded by two adjacent signal lines 11 and two adjacent scanning lines 12. The pixels are arranged in rows and columns, forming a matrix pattern.

Each pixel has a switching element located at the intersection of one signal line 11 and one scanning line 12. The switching element is, for example, a thin film transistor (TFT) 13. The TFT 13 has a gate electrode 13a, a gate insulating film 13b, a semiconductor film 13c, a source electrode 13d, and a drain electrode 13e. The gate electrode 13a is an end part of the scanning line 12. The gate insulating film 13b is provided on the gate electrode. The semiconductor film 13c faces the gate electrode across the gate insulating film. The source electrode 13d is connected to one region of the semiconductor film. The drain electrode 13e is connected to the other region of the semiconductor film. The source electrodes 13d is connected to the signal line 11. The drain electrode 13e is connected to a pixel electrode 14, which will be described later.

In the region surrounded by the sealing member 7, red color layers 5R, green color layers 5G and blue color layers 5B are arranged on the glass substrate 10 including the signal lines, scanning lines 12 and FTFs 13. More precisely, they are arranged side by side, in a repeating sequence of red, green and blue in this order, and constitute the color filter 5. The color layers 5R, 5G and 5B are provided in the form of stripes and have their edge parts laid on the signal lines 11, respectively.

On the color layers 5R, 5G and 5B, pixel electrodes 14 are provided. The pixel electrodes 14 are transparent conducting strips made of, for example, ITO (indium Tin oxide). Each pixel electrode 14 is electrically connected to the drain electrode 13e of the corresponding TFT 13 via a contact hole 5h made in each color layer. Note that each pixel has a TFT 13 and a pixel electrode 14.

On the pixel electrodes 14, column spacers 15 stand and are arranged at a predetermined density. An alignment film 17 is provided on the color layers 5R, 5G and 5B and on the pixel electrodes 14.

The drive-circuit connection region R2 has a signal-line-driving circuit connection region R3, or first drive-circuit connection region, and a scanning-line-driving circuit connection region R4, or second drive-circuit connection region. One end part of each signal line 11 extends over the sealing member 7 and lies in the signal-line-driving-circuit connection region R3 that exists outside the sealing member. Each scanning line 12 has one end part extending over the sealing member 7 and lies in the scanning-line-driving circuit connection region R4 that exists outside the sealing member.

In this embodiment, the signal line driving circuit 40 is arranged in the signal-line-driving-circuit connection region R3, and the scanning line driving circuit 50 is arranged in the scanning-line-driving circuit connection region R4. The signal-line driving circuit 40 has four signal-line driving circuit units 41. The scanning line driving circuit 50 has three scanning-line driving circuit units 51. In the signal line driving circuit connection region R3, the signal line driving circuit 40 is connected to the signal lines 11. In the scanning-line-driving circuit connection region R4, the scanning line driving circuit 50 is connected to the scanning lines 12.

The other end part of each signal line 11 extends beyond the sealing member 7 and lies on the peripheral edge of the glass substrate 10 that exists outside the sealing member. In each signal line 11, the other end part is extended opposite to the one end part. The other end part (not shown) of the scanning line 12 extends beyond the sealing member and lies on the peripheral edge of the glass substrate 10 that exists outside the sealing member. In each scanning line 12, the other end part is extended opposite to the one end part.

The counter substrate 3 comprises a glass substrate 20, which is a transparent insulating substrate. On the glass substrate 20, a counter electrode 21 is provided. The counter electrode 21 is a transparent conducting film made of, for example, ITO. An alignment film 22 is formed on the counter electrode 21.

Each display element 6 has a pixel and a part of the counter electrode 21. The counter electrode 21 overlaps the pixel. More specifically, each display element 6 has a TFT 13, a pixel electrode 14 connected to the TFT, a color layer overlapping the pixel electrode, a part of the counter electrode 21, a part of the alignment film 17, a part of the alignment film 22, and a part of the liquid crystal layer 4.

The array substrate 2 and the counter substrate 3 are arranged opposite to each other. They are spaced apart by, for example, 5 μm, by the column spacer 15. A gap 30 between those parts of the array substrate 2 and counter substrate 3 which lie outside the sealing member 7 is filled with filler, forming filler layers 8, only at those two sides of the substrates 2 and 3 to which the other end parts of the signal lines 11 and scanning lines 12 extend. In this embodiment, the filler layers 8 are made of ultraviolet curing type resin, because this resin used as material for preventing electric corrosion.

The back light unit 9 is arranged on an outer surface of the array substrate 2. The back light unit 9 has a light-guiding plate 9a, a light source 9b, and a reflecting plate 9c. The light-guiding plate 9a is opposed to the array substrate 2. The light source 9b and the reflecting plate 9c are arranged at one side of the light-guiding plate 9a.

The configuration of the liquid crystal display will be described in greater detail, along with the method of manufacturing the display.

First, glass substrate 10 is prepared. Film forming and film patterning are repeated on this glass substrate 10. This ordinary manufacturing process forms signal lines 11, scanning lines 12, TFTs 13, color filters 5, pixel electrodes 14, column spacers 15, and an alignment film 17 are formed on the glass substrate 10.

On the counter substrate 3, a glass substrate 20 is prepared first. On the glass substrate 20, a counter electrode 21 is formed. An alignment film 22 is then formed on the counter electrode 21.

Subsequently, a heat-hardened type sealing member 7 is printed, extending along the periphery of the glass substrate 20. The sealing member 7 is so printed that it has a crystal-applying port (not shown) through which to pour liquid crystal. Next, a predetermined gap is provided between the array substrate 2 and the counter substrate 3, using the column spacers 15. The array substrate 2 and the counter substrate 3 are thereby opposed to each other. The edge part of the counter substrate is bonded to the junction region R1 of the array substrate, by using the sealing member 7. Thereafter, the sealing member 7 is heated and cured. The array substrate 2 and the counter substrate 3 are thereby fastened to each other. Thereby, empty display panel 1a is formed.

Liquid crystal is poured by means of vacuum injection, through the crystal-applying port (not shown) made in the sealing member 7. The crystal-applying port is closed with sealant (not shown). The liquid crystal is thereby sealed in the space defined by the array substrate 2, counter substrate 3 and sealing member 7. A liquid crystal layer 4 is thereby formed. The signal line driving circuit 40 is mounted in the signal-line-driving-circuit connection region R3 of the array substrate 2. The scanning line driving circuit 50 is mounted in the scanning line driving circuit connection region R4. A display panel 1a is thereby provided, which has the liquid crystal layer 4, signal line driving circuit 40 and scanning line driving circuit 50. Some other display panels 1a of the same configuration are prepared.

Figure 5:
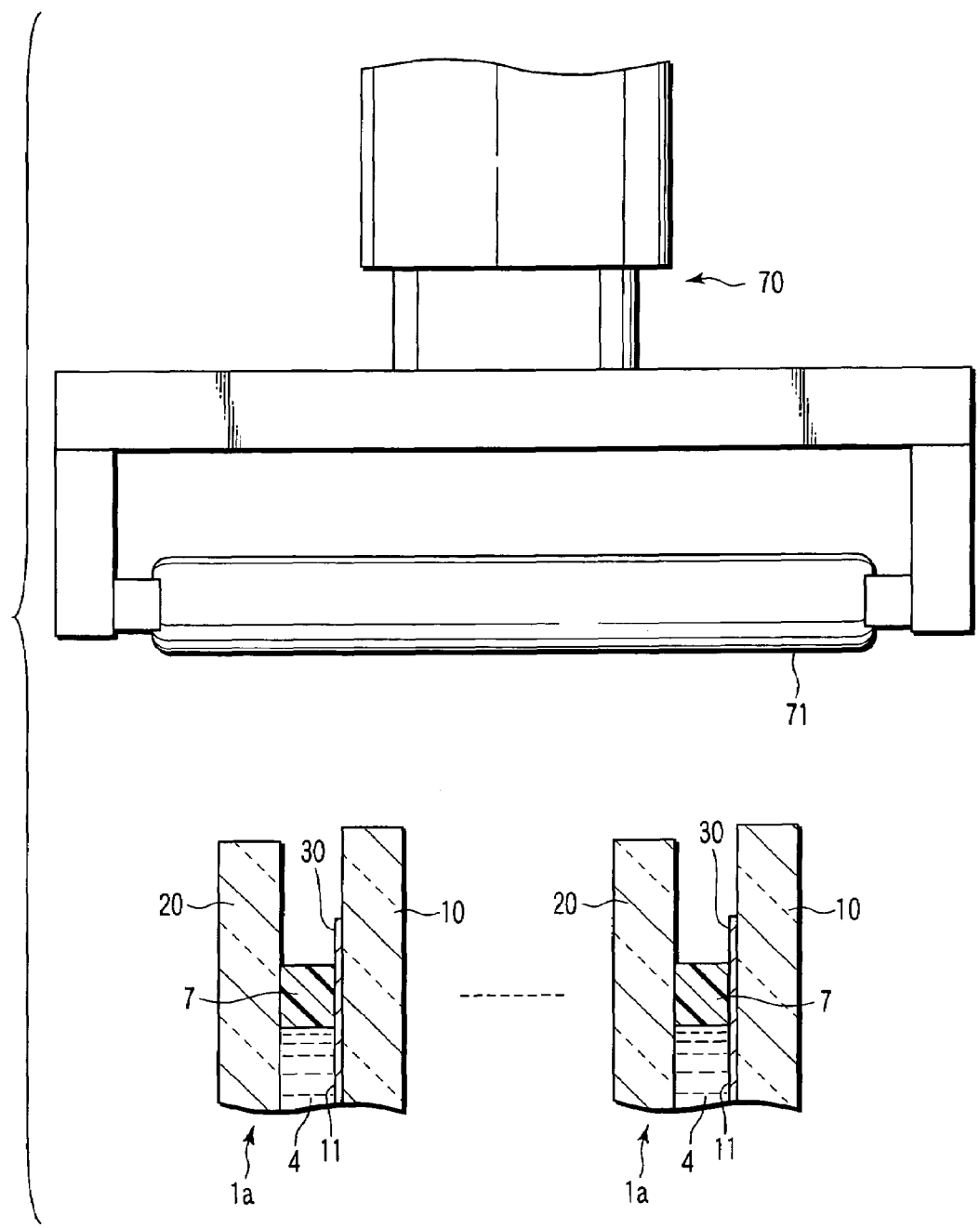
FIG. 5 illustrates how the ultraviolet-curable resin is applied to the liquid crystal display panel, by using a roller.
Figure 6:
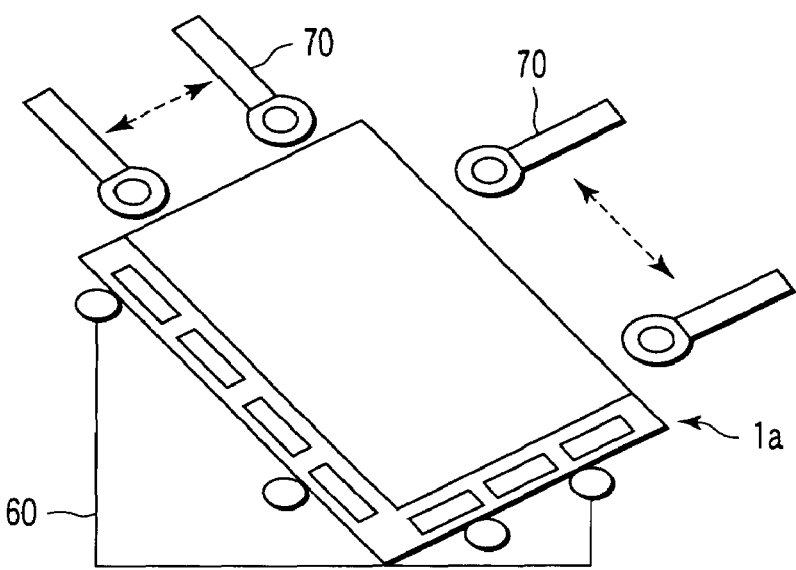
FIG. 6 illustrates, like FIG. 5, how the ultraviolet-curable resin is applied to the liquid crystal display panel, by using a roller.

All display panels 1a prepared are arranged, each standing in the vertical direction, as shown in FIGS. 5 and 6. In FIG. 5, the cross sections of the panels 1a are shown, and a roller unit 70 is shown as viewed from one side. The display panels 1a are opposed to one another and arranged with their lower edges lying in the same plane. To arrange the display panels 1a in this manner, it suffices to place them on a mounting base 60. The mounting base 60 holds the panels 1a steadfastly. In this embodiment, the mounting base 60 is designed to hold the display panels 1a inclined at 45°. Namely, the display panel 1a is fixed at such a position that its two sides, which define an angle in a vertical plane and along which the other end parts of the signal line 11 and scanning line 12 extend, incline to a horizontal plane.

Then, ultraviolet-curable resin is applied to a roller 71, more precisely to the roller 71 of the roller unit 70. The roller 71, which is made of fibrous material, is thereby impregnated with the resin. The ultraviolet-curable resin has viscosity of 500 CPS to 8000 CPS.

Thereafter, the roller 71 impregnated with the violet-curable resin is moved on those two edges of every display panel 1a, along which the other end parts of the signal lines 11 and scanning lines 12 extend. The roller 71 is so moved back and forth, at most three times. The gaps 30 of the display panels 1a are thereby filled with the ultraviolet-curable resin.

Figure 7:
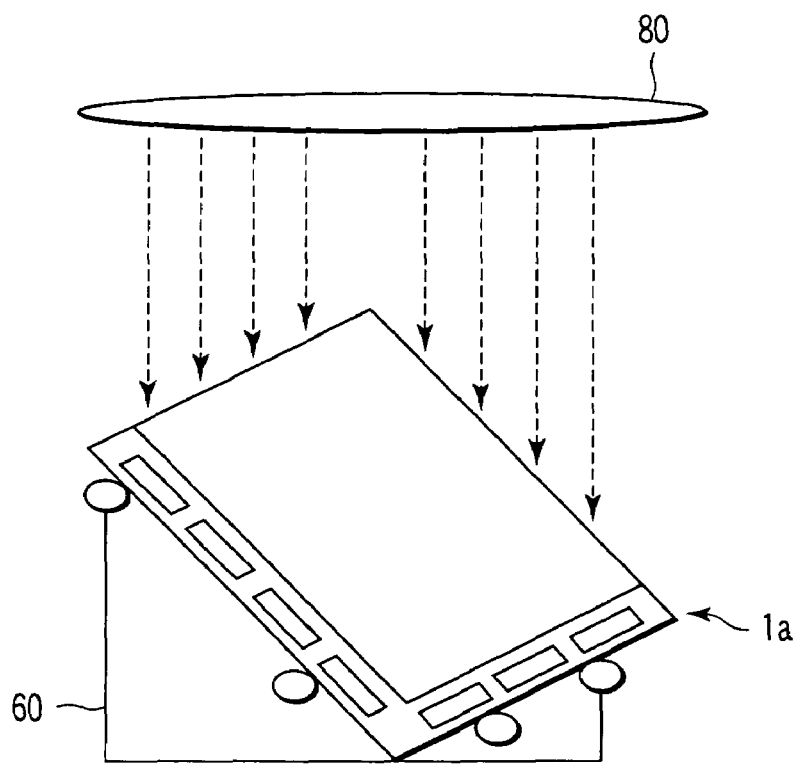
FIG. 7 is a diagram showing how ultraviolet rays are applied to the liquid crystal display panel.

As shown in FIG. 7, each display panel 1a is left mounted on the mounting base 60. An ultraviolet lamp 80, or ultraviolet-rays applying unit, is located above the upper edges of the display panels 1a for 30 seconds at a cumulative dose of 2500 mJ/cm$^2$. The ultraviolet rays cure the ultraviolet-curable resin filled in the gaps 30 of the panels 1a. The layers of ultraviolet-curable resin, existing at the panels 1a, are cured at the same time. Resin layers 8 are thereby formed in the gaps 30 of the display panels 1a. A plurality of liquid crystal panels 1 are thus produced at the same time.

The liquid crystal display panels 1a are removed from the mounting base 60. A back light unit 9, a bezel (not shown) and the like are attached to each liquid crystal panel 1a. Liquid crystal displays are thereby manufactured.

The inventor hereof evaluated liquid crystal display panels, some made by applying the resin with a roller and the others made by applying the resin by a dispenser, in terms of: (1) the thickness t of the resin layer 8 at the edges of the panel 1; (2) the presence or absence of ultraviolet-curable resin on the outer surfaces of the glass substrates 10 and 20; (3) the amount of ultraviolet-curable resin used; (4) the permeability of the resin into the gap 30; (5) the time required to apply the resin; and (6) the operating reliability. Further, they evaluated the manufacture efficiency and the overall value of each liquid crystal panel. FIG. 8 shows the results of evaluation. In FIG. 8, "◯" indicates "good", "Δ" indicates "normal", "□" indicates "poor", and "×" indicates "no good".

Figure 2:
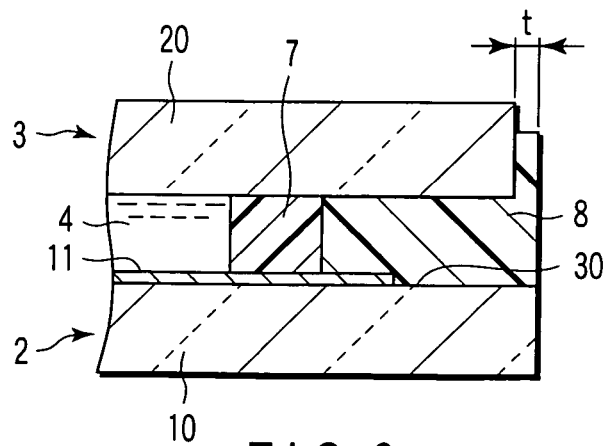
FIG. 2 is a sectional view of the liquid crystal display panel, taken along line II-II shown in FIG. 1.
Figure 3:
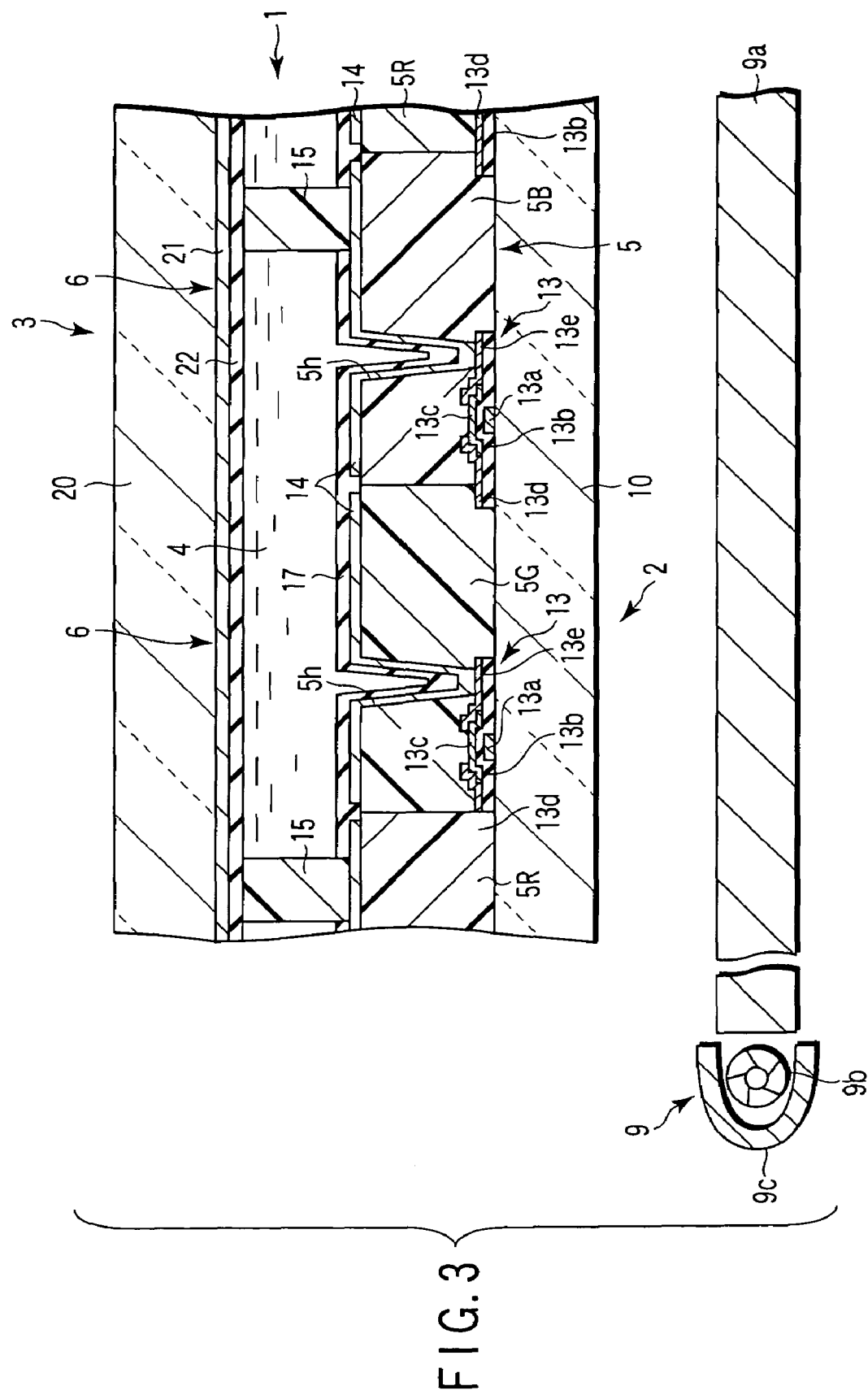
FIG. 3 is a sectional view of a liquid crystal display having a liquid crystal display panel of the type shown in FIGS. 1 and 2.
Figure 4:
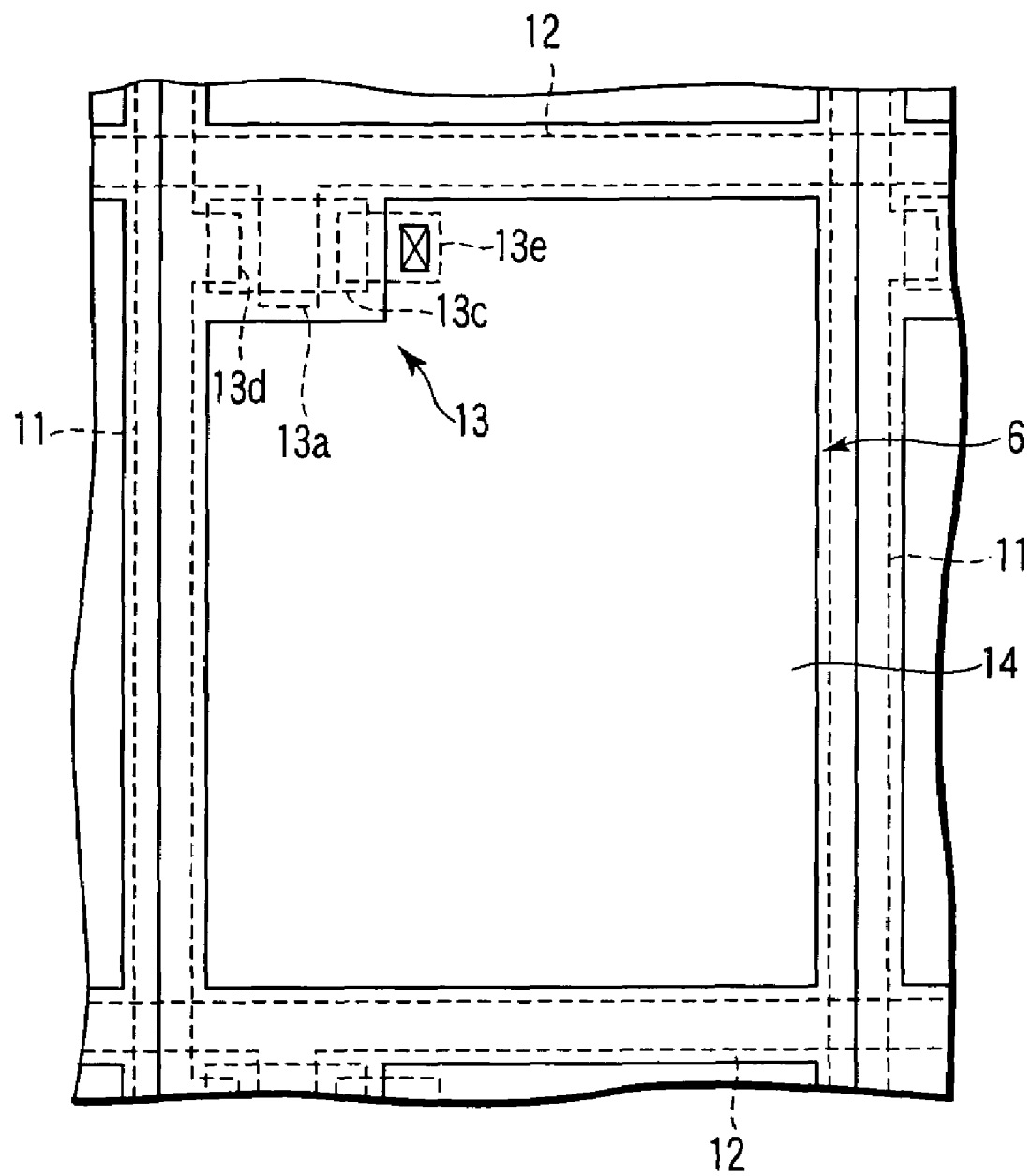
FIG. 4 is a plan view schematically showing the pixels provided on the array substrate of the liquid crystal display panel.

First, the thickness t of the resin layer 8 at the edges of each panel 1a was measured. As shown in FIGS. 2 and 8, the resin layer 8 formed by applying the ultraviolet-curable resin with the roller was 10 μm to 20 μm thick. This is because the ultraviolet-curable resin had not dripped over the outer surfaces of the glass substrates 10 and 20. The amount of the ultraviolet-curable resin used was as small as 0.00085 g per liquid crystal display panel.

On the other hand, the resin layer 8 formed by applying the resin by the dispenser 200 μm to 300 μm thick. This is because the ultraviolet-curable resin had dripped over the outer surfaces of the glass substrates 10 and 20. The amount the ultraviolet-curable resin used was 0.06375 g per liquid crystal display panel. This amount was 75 times as large as the resin applied with the roller.

Then, the permeability of the resin into the gap 30 was measured. As shown in FIGS. 8 and 9, the permeability was 95% when the resin was applied with the roller for 20 seconds. The permeability reached 100% when the resin was applied with the roller for 60 seconds or more. Hence, the applying the resin with the roller is a method that increases the permeability of resin.

By contrast, the permeability was 40% when the resin was applied with the dispenser. Therefore, a space was inevitably made in the gap 30. In other words, the permeability of resin could not be increased.

Next, the time required to apply the resin to the liquid crystal display panels was investigated. As shown in FIG. 8, it took only 12.8 seconds to apply the resin by using the roller to each liquid crystal display panel. Therefore, the method of filling the gaps 30 of the liquid crystal display panels 1a with ultraviolet-curable resin applied with the roller is effective in shortening of the processing time. Further, it is better to move the roller 71 continuously on the two edges of each display panel.

By contrast, it took 74.7 seconds to apply the resin to each display panel by using the dispenser. Obviously, this time is loner than the time required to apply the resin with the roller.

The liquid crystal display panels were evaluated in terms of operating reliability. More specifically, the liquid crystal display panels were left for a long time at temperature of 85° C. and humidity of 85%. As seen from FIGS. 8 and 10, neither the signal lines 11 nor the scanning lines 12 underwent no further electric corrosion in any panel made by applying the resin with the roller, though it had been left for 1000 hours in such conditions. The liquid crystal display panel thus made was proved to be very reliable product.

In any liquid crystal display panel made by applying the resin using the dispenser, electric corrosion took place on the signal lines 11 and scanning lines 12 when the panel was left for a long time at temperature of 85° C. and humidity of 85%. This panel was proved not to operate reliability. When the panel was left for a long time at temperature of 60° C. and humidity of 90%, electric corrosion took place on the signal lines 11 and scanning lines 12, too.

In view of the above, the panel made by applying the resin with the roller excels in manufacture efficiency and in other respects, too.

In the method of manufacturing the liquid crystal display panel of the above-described configuration, the ultraviolet-curable resin is applied with a roller to fill gap 30 between the counter substrate 3 and that part of the array substrate 2 which lies outside the sealing member 7. The ultraviolet curing resin can therefore well permeate into the gap 30, making no space in the gap 30, even if the liquid crystal display panel is thin. Thus, electric corrosion can be prevented from occurring on the signal lines or the scanning lines even if these lines have their other end parts located outside the sealing member 7.

The present invention is not limited to the embodiment described above. Various changes and modifications can be made, without departing from the scope of the invention. For example, the material for preventing electric corrosion is not limited to ultraviolet-curable resin. Instead, thermosetting resin may be used to achieve the same advantage. In this case, it suffices to heat the resin to make it hard.

If the display elements 6 (pixels) have an auxiliary capacitance element each, it suffices to form a resin layer 8 to prevent not only electric corrosion of the signal line 11 and scanning line 12, but also corrosion of the auxiliary capacitance line that constitutes an auxiliary capacitor. The resin layer 8 formed in the gap 30 is provided, not for preventing only the electric corrosion of wires.

The present invention is not limited to a method of manufacturing a liquid crystal display panel. The invention can be applied to manufacture of any other types of display panels.

What is claimed is:

1. A method of manufacturing a display panel which comprises a first substrate, a second substrate arranged opposite to the first substrate with a gap therebetween, a plurality of display elements provided between the first and second substrates, a sealing member surrounding the display elements and bonding the first and second substrates to each other, and a filler layer provided between the first and second substrates and located outside the sealing member, the method comprising:

applying filler to a roller;

moving the roller on an edge of the display panel, thereby filling a gap between the second substrate and that part of the first substrate which lies outside the sealing member; and curing the filler filled in the gap.

2. The method according to claim 1, wherein the filler is a material which prevents electric corrosion.

3. The method according to claim 1, wherein the display panel and other display panels of the same type as the display panel are arranged, with all display panels aligned, at one edge, in the same plane; and the roller is moved on an edge of each display panel, thereby filling the filler in the gap between the second substrate of each display panel and that part of the first substrate thereof, which lies outside the sealing member; and the fillers filled in all display panels are cured at the same time.

4. A method of manufacturing a display panel which comprises a first substrate, a second substrate arranged opposite to the first substrate with a gap therebetween, a plurality of display elements provided between the first and second substrates, a sealing member surrounding the display elements and bonding the first and second substrates to each other, a plurality of lines provided on that surface of the first substrate which faces the second substrate, and extending outwards, at one end part, from the sealing member, and an electric-corrosion preventing member provided between the first and second substrates and located outside the sealing member, said method comprising:

applying electric-corrosion preventing material to a roller;

moving the roller on that edge of the display panel, from which other end parts of the lines extend outwards, thereby filling a gap between the second substrate and that part of the first substrate which lies outside the sealing member; and curing the electric-corrosion preventing material filled in the gap.

5. The method according to claim 1, wherein the display panel is in a vertical position, with two sides inclining to a horizontal plane and defining an angle in a vertical plane, and the roller is moved on said edge of the display panel.

6. The method according to claim 4, wherein the display panel is in a vertical position, with two sides inclining to a horizontal plane and defining an angle in a vertical plane, and the roller is moved on said edge of the display panel.

7. The method according to claim 4, wherein the display panel is in a vertical position, with two sides inclining to a horizontal plane and defining an angle in a vertical plane, and the roller is moved on said edge of the display panel, the other end parts of the first lines extend along one of said two sides, and the other end parts of the second lines extend along the other of said two sides.

8. The method according to claim 7, wherein the roller is continuously moved on the two sides of the display panel.

9. The method according to claim 2, wherein the electric-corrosion preventing material is ultraviolet-curable resin applied to the roller, and ultraviolet rays are applied to the ultraviolet-curable resin to cure the resin.

10. The method according to claim 4, wherein the electric-corrosion preventing material is ultraviolet-curable resin applied to the roller, and ultraviolet rays are applied to the ultraviolet-curable resin to cure the resin.

11. The method according to claim 1, wherein the roller is moved several times on the edge of the display panel.

12. The method according to claim 4, wherein the roller is moved several times on the edge of the display panel.

* * * * *